United States Patent
Kapinos et al.

(10) Patent No.: US 12,047,453 B2
(45) Date of Patent: Jul. 23, 2024

(54) DIGITAL ASSISTANT UTILIZATION IN A VIRTUAL ENVIRONMENT

(71) Applicant: Lenovo (Singapore) Pte. Ltd., Singapore (SG)

(72) Inventors: Robert James Kapinos, Durham, NC (US); Timothy Winthrop Kingsbury, Cary, NC (US); Russell Speight VanBlon, Raleigh, NC (US); Scott Wentao Li, Cary, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 74 days.

(21) Appl. No.: 16/587,325

(22) Filed: Sep. 30, 2019

(65) Prior Publication Data
US 2021/0099523 A1   Apr. 1, 2021

(51) Int. Cl.
*H04L 67/125* (2022.01)
*G06F 3/01* (2006.01)

(52) U.S. Cl.
CPC ............ *H04L 67/125* (2013.01); *G06F 3/011* (2013.01)

(58) Field of Classification Search
CPC ..... H04L 67/125; G06F 3/011; G06T 19/006; G06N 20/00
USPC .................................. 709/217; 345/633, 419
See application file for complete search history.

(56) References Cited

U.S. PATENT DOCUMENTS

| | | | |
|---|---|---|---|
| 10,621,564 B1* | 4/2020 | Kalaboukis | H04L 67/02 |
| 2017/0289350 A1* | 10/2017 | Philbin | H04L 67/146 |
| 2019/0332400 A1* | 10/2019 | Spoor | G06F 9/453 |
| 2020/0110560 A1* | 4/2020 | Hariton | G06F 3/1206 |
| 2020/0265842 A1* | 8/2020 | Singh | G10L 17/00 |
| 2020/0388285 A1* | 12/2020 | Spiewla | G10L 15/22 |
| 2021/0082416 A1* | 3/2021 | Talwar | G06F 3/017 |

OTHER PUBLICATIONS

Dickson ("Why AR Headsets Are The True Home for AI Assistants", https://bdtechtalks.com/2018/08/13/augmented-reality-artificial-intelligence-assistants/, Aug. 13, 2018, accessed on Dec. 5, 2020) (Year: 2018).*

* cited by examiner

*Primary Examiner* — Suraj M Joshi
*Assistant Examiner* — Sherman Lin
(74) *Attorney, Agent, or Firm* — Ference & Associates LLC

(57) ABSTRACT

One embodiment provides a method, including: detecting, while in a virtual environment effectuated by a virtual reality device, an activation command to activate a digital assistant embodied on a disparate digital assistant device; establishing a connection with the disparate digital assistant device; receiving, subsequent to the establishing and at the virtual reality device, a user command directed toward the digital assistant; and performing, using the digital assistant while in the virtual environment, an action corresponding to the user command. Other aspects are described and claimed.

18 Claims, 3 Drawing Sheets

DIGITAL ASSISTANT UTILIZATION IN A VIRTUAL ENVIRONMENT

BACKGROUND

The popularity of digital assistants and dedicated digital assistant devices has increased in recent years. Such systems allow a user to interact with an information handling device ("device"), for example smart phone, tablet, smart speaker, laptop and/or personal computer, and the like, in a more natural way (e.g., through the use of natural language voice input, etc.). Additionally, the prevalence and practical functionality of virtual and augmented reality systems has also increased. The combination of these two technologies may help improve a user's experience with their device.

BRIEF SUMMARY

In summary, one aspect provides a method, comprising: detecting, while in a virtual environment effectuated by a virtual reality device, an activation command to activate a digital assistant embodied on a disparate digital assistant device; establishing a connection with the disparate digital assistant device; receiving, subsequent to the establishing and at the virtual reality device, a user command directed toward the digital assistant; and performing, using the digital assistant while in the virtual environment, an action corresponding to the user command.

Another aspect provides an information handling device, comprising: a processor; a memory device that stores instructions executable by the processor to: detect, while in a virtual environment effectuated by the information handling device, an activation command to activate a digital assistant embodied on a disparate digital assistant device; establish a connection with the disparate digital assistant device; receive, subsequent to the establishing and at the information handling device, a user command directed toward the digital assistant; and perform, using the digital assistant while in the virtual environment, an action corresponding to the user command.

A further aspect provides a product, comprising: a storage device that stores code, the code being executable by a processor and comprising: code that detects, while in a virtual environment, an activation command to activate a digital assistant embodied on a disparate digital assistant device; code that establishes a connection with the disparate digital assistant device; code that receives, subsequent to the establishing, a user command directed toward the digital assistant; and code that performs, using the digital assistant while in the virtual environment, an action corresponding to the user command.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
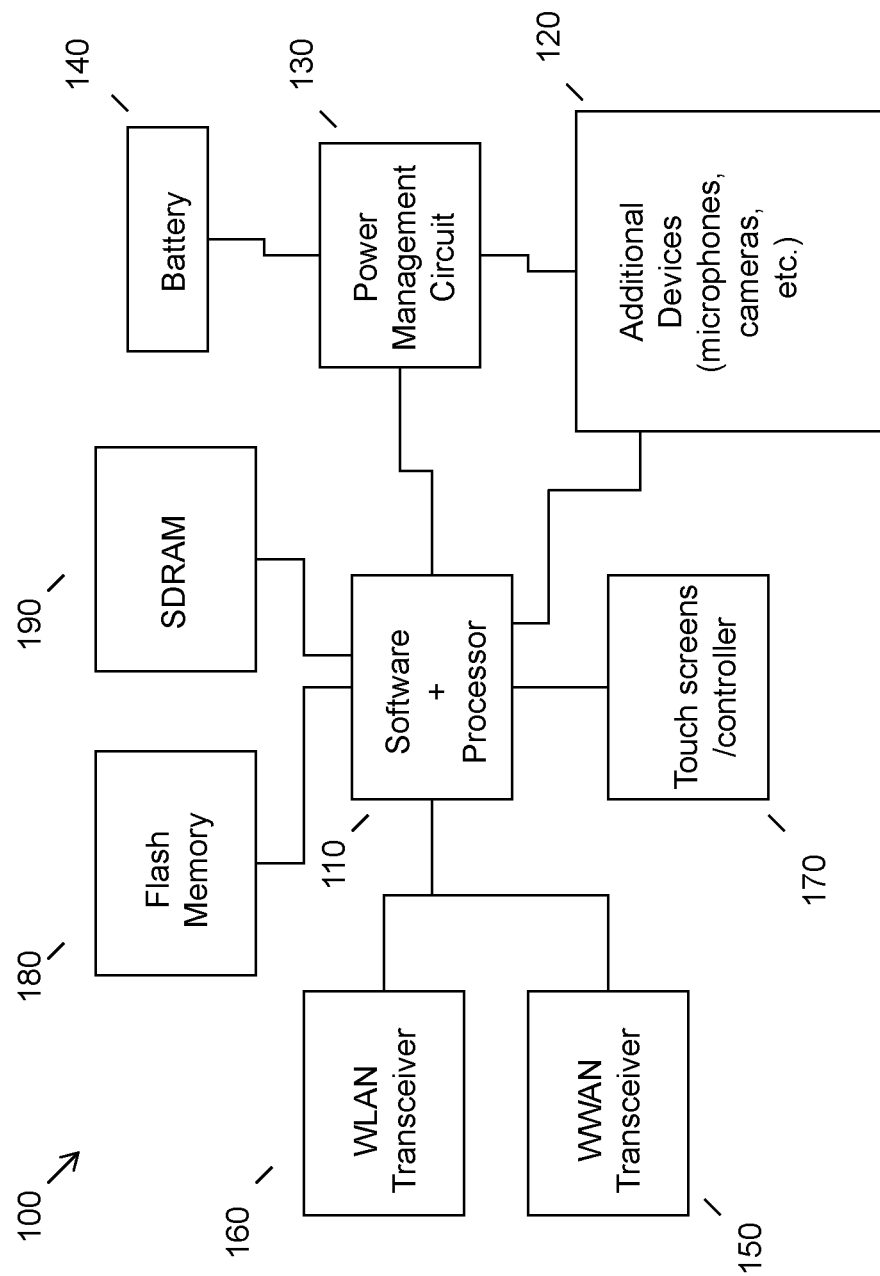
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Interfacing with the external world while immersed in a virtual environment has conventionally been very difficult. More particularly, users engaged in a virtual reality ("VR") experience (e.g., facilitated by a virtual reality headset or other virtual reality device, etc.) generally find it difficult to perform real world actions, or command another device to perform real world actions, without disrupting the virtual experience.

For augmented reality ("AR") systems, one existing solution is to utilize AR functions to surface real world control. However, although this solution is good for AR systems (e.g., at least because computer generated AR representations are superimposed over a user's view of the real world, etc.), a user engaged in a VR environment is unable to visualize the real world and would therefore need to remove their VR headset, or otherwise remove themselves from the VR environment, in order to perform a real world function. Another existing solution may have a real world connection feature integrated into a VR application. However, such a feature is generally limited to the specific application it is integrated within and may not be available in other VR applications.

Accordingly, an embodiment allows a user to leverage the capabilities of a real-world digital assistant while immersed in a virtual environment. In an embodiment, an activation, or summon, command may be detected at a VR device while a user is engaged in a VR environment. The activation command may serve to activate a digital assistant embodied on a disparate digital assistant device (i.e., separate from the virtual reality device). An embodiment may establish a connection with the digital assistant device (e.g., before the activation command, responsive to the activation command, etc.) and receive, subsequent to the establishment, a user command directed toward the digital assistant while still engaged in the VR environment. An embodiment may thereafter perform an action corresponding to the user command using the capabilities of the digital assistant. For example, a user may command the digital assistant to perform a real world action (e.g., lower the room temperature, call an individual, adjust the volume of an electronic device, etc.) while still engaged in the VR environment. Such a method may combine the capabilities of digital assistant devices and VR technologies to expand a user's capabilities while in the virtual world.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
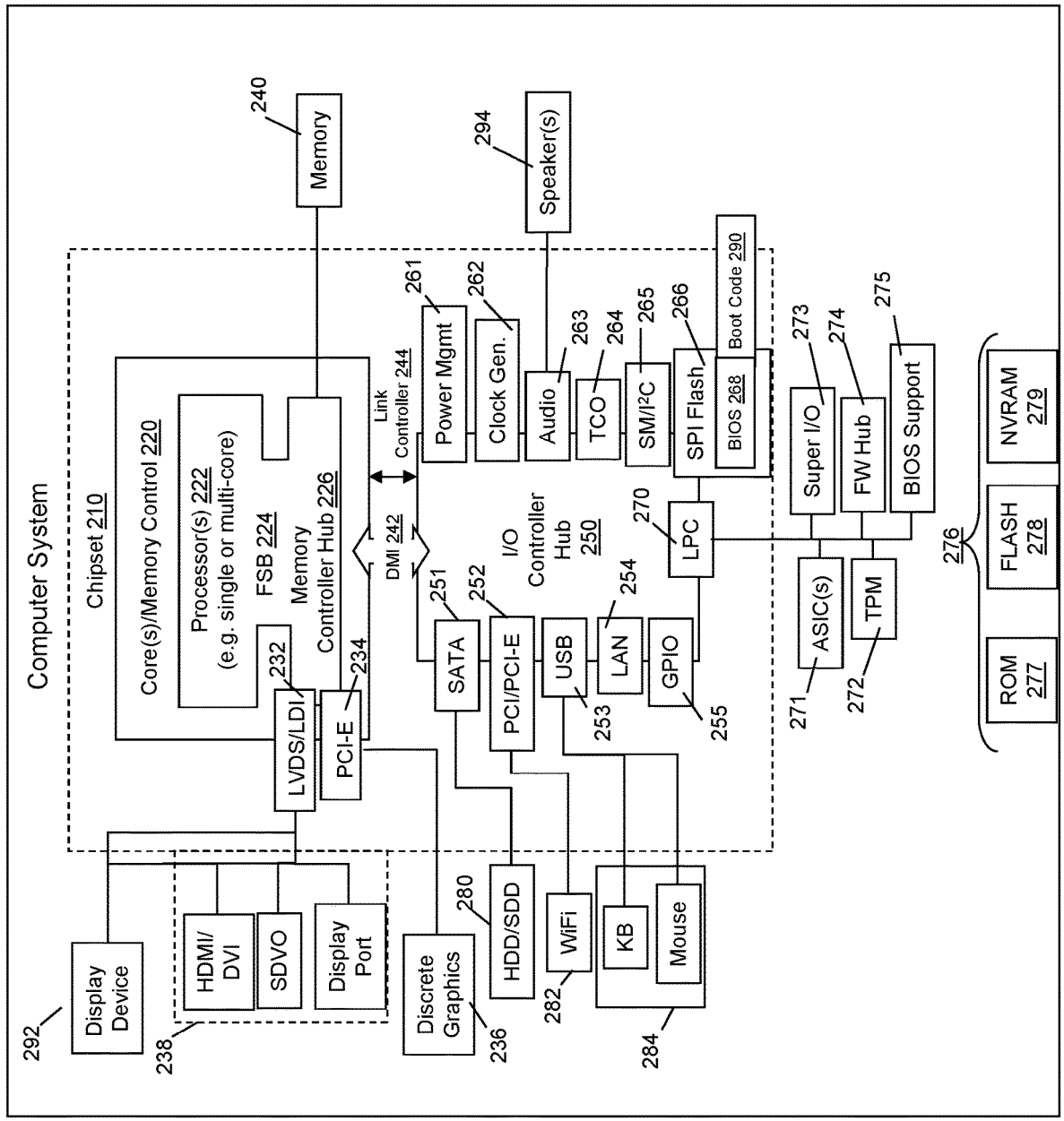
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, NC, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of both implementing a virtual reality environment and interacting with other devices. For example, the circuitry outlined in FIG. 1 may be implemented in a smart phone or tablet embodiment, whereas the circuitry outlined in FIG. 2 may be implemented in a laptop.

Figure 3:
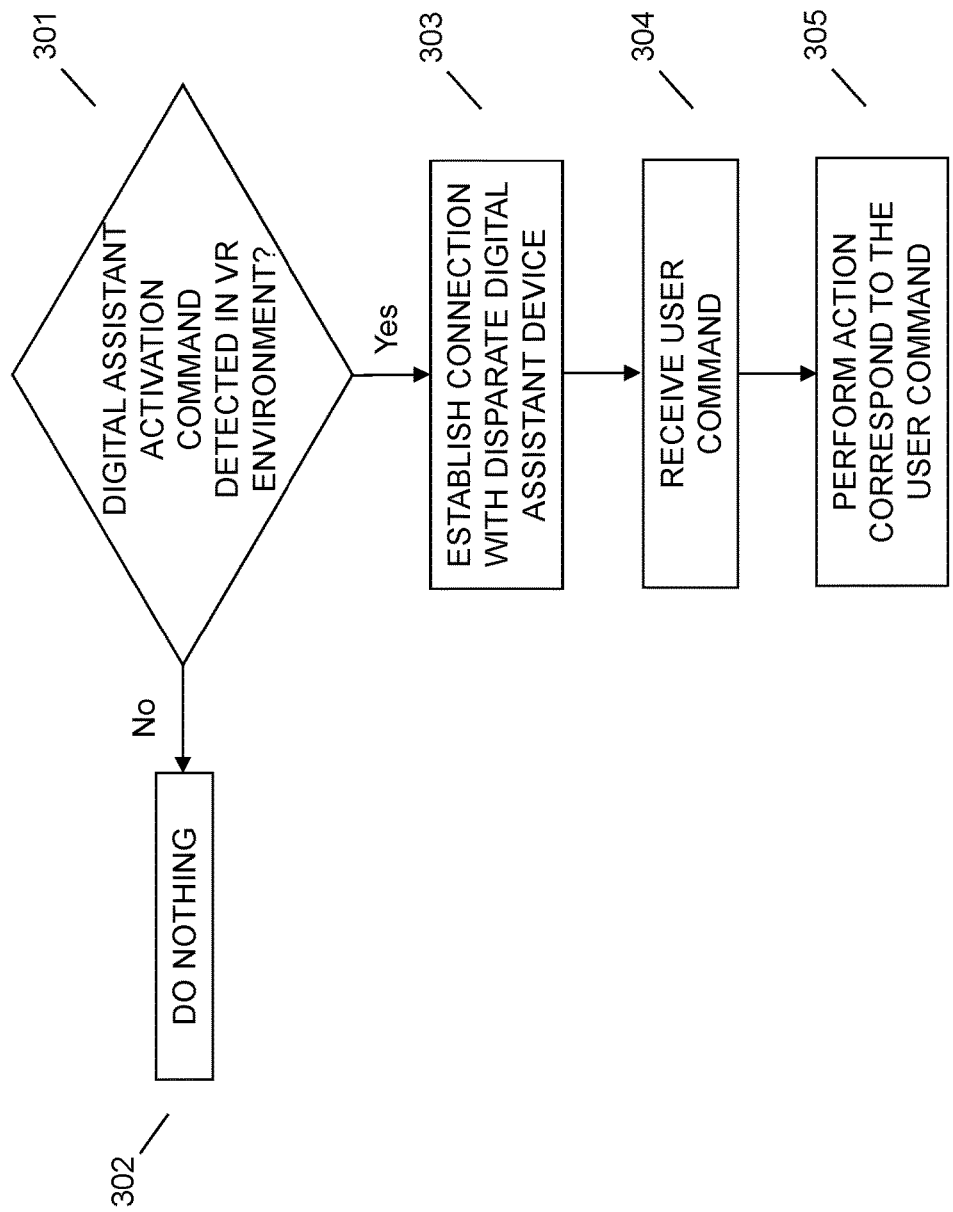
FIG. 3 illustrates an example method of interacting with a digital assistant while in a virtual environment.

Referring now to FIG. 3, an embodiment may leverage the capabilities of a disparate digital assistant device to perform one or more actions while a virtual environment is active. At 301, an embodiment may detect an activation command at a VR device while a virtual environment is active. The activation command may be provided by a user, another user present in the same virtual environment, etc. In an embodiment, the activation command may be virtually any type of command known to activate a digital assistant such as a voice command, a gesture command, a selection command, a keyboard command, etc., and may be detected by any conventional device capable of detecting the foregoing input techniques.

In an embodiment, the activation command may activate a digital assistant on another device. For example the activation command may activate a digital assistant embodied on a user's smart phone or smart watch. As another example, the activation command may activate a dedicated digital assistant that is part of a home automation network (e.g., the device comprising the digital assistant may be part of the Internet of Things (IOT) and may be in communication with other IOT devices, etc.). In an embodiment, the digital assistant device and the virtual reality device may be proximate to one another (e.g., in the same room, etc.) or, alternatively, may be remotely positioned (e.g., in different rooms, different buildings, different geographic areas, etc.). In an embodiment, the activation command may be a dedicated activation command (e.g., that simply serves to activate the digital assistant, etc.) or, alternatively, may be a wake word that is part of a broader user action command, as further described below.

Responsive to not detecting, at 301, an activation command, an embodiment may, at 302, take no further action. Conversely, responsive to detecting, at 301, an activation command, an embodiment may, at 303, establish a connection with the disparate digital assistant device. Additionally or alternatively, the connection may have been established prior to the detection of the activation command. For example, when a VR device is turned on, an embodiment may automatically reach out to one or more disparate digital assistant devices in an effort to establish a connection.

In an embodiment, the connection between the VR device and digital assistant device may be a wireless connection. For example, when the two devices are situated in relative proximity (e.g., in the same room, in the same building, etc.), an embodiment may utilize a BLUETOOTH connection, a near field communication (NFC) connection, and the like. Additionally or alternatively, when the two devices are situated in different geographic locations (e.g., in different buildings, different geographic localities, etc.), an embodiment may utilize a wireless connection, e.g., a Wi-Fi connection, a mobile data connection, or a cloud computing service. In an embodiment, the connection between the two devices may remain active until a predetermined event is detected (e.g., a dismiss command is detected, a predetermined inactivity time period has been identified, a VR device power-off event has been detected, etc.).

At 304, subsequent to the establishment of the connection, an embodiment may receive a user action command at the VR device. The user action command may instruct the digital assistance device to perform virtually any real world function digital assistants conventionally perform (e.g., adjust the temperature or light levels in a room, turn an appliance on or off, play a song, transmit a communication to another individual, adjust an aspect of a user's calendar, etc.). Alternatively, the user action command may instruct a device to perform a function in the VR world (e.g., adjust the brightness of a virtual display, adjust the sensitivity of a controller, adjust the size of displayed virtual objects, etc.).

Similar to the activation command, the user action command may be provided to the VR device using virtually any known method of providing a command to a device. More particularly, the user action command may be provided to the VR device while a virtual environment is active and/or may be provided from within the virtual environment. In certain situations, the activation command and the user action command may be provided by a user in combination. For example, the activation command may serve as the digital assistant wake word whereas the user action command may follow the wake word and serve as the actual user query or command.

As an example of the foregoing, a user may be engaged in a VR simulation and wish to interact with an accessible digital assistant without leaving the simulation. The user in this situation may first provide the activation command, "Hey, Digital Assistant Name" followed by the actual user command, "move my scheduled 2:00 pm meeting to 4:00 pm". As another example, a user may interact with a manifestation of the digital assistant in the virtual space. More particularly, the digital assistant may be represented by a virtual object or character in the virtual space that a user may interact with much the same way that they would interact with a non-player character ("NPC") in a conventional video game.

In an embodiment, a user action command may be received from another individual in the same virtual space as the user. For example, the user and another individual may be experiencing the same VR simulation together or may be playing with each other in a co-operative mode in a VR video game. In either of these situations, the other individual may provide a user action command that is directed toward the user's digital assistant, and vice versa. In an embodiment, the types of commands that a user's digital assistant may actually process from the other individual are dependent upon the allowances and/or the security risks associated with each command. For example, if the other individual provides a low risk command such as a request to display sports scores or current weather data, the digital assistant of the embodiments may immediately perform this function. Alternatively, if the other individual provides a high risk command such as a request to transfer money from the user's bank account or to access a user's private profile, the digital assistant may either immediately deny that request or present a challenge that requires a correct response.

At 305, an embodiment may perform an action that corresponds to the user command. As previously discussed, the action may be a real world action or an action within the VR environment. In an embodiment, the action may be performed solely by the digital assistant device or, alternatively, may be performed by other devices working in conjunction with the digital assistant device. For example, if the command suggests adjustment of an aspect of another real world object, the digital assistant device may provide the other device with the adjustment indication, at which point the other device may be responsible for completing the command. Additionally or alternatively, a user may enlist the services of another digital assistant device associated with another individual to perform one or more actions corresponding to a user command. More particularly, an embodiment may first identify another digital assistant that is associated with another individual in the same virtual space as the user. Responsive to receiving a user action command, the user's digital assistant device may communicate with the other digital assistant to identify the best way to perform a relevant function (e.g., determining which steps each digital assistant should perform in fulfillment of the function, etc.).

The various embodiments described herein thus represent a technical improvement to conventional methods of interacting with the real world while engaged in a virtual environment. Using the techniques described herein, an embodiment may activate and transmit a user action command to a digital assistant device while a user is immersed in a virtual environment on a VR device. A digital assistant of the device may then perform a corresponding action without requiring the user to exit the virtual space. Such a method may improve a user's VR experience by limiting the occurrences of virtual environment interruption.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    detecting, while in a virtual reality environment effectuated by a virtual reality device, an activation command from a user to activate a digital assistant embodied on a digital assistant device of another user;
    establishing a connection with the digital assistant device of the another user;
    producing, subsequent to having established the connection, a manifestation of the digital assistant of the another user in the virtual reality environment of the digital assistant device of the user;
    identifying, subsequent to the producing, a user command from the user directed toward the manifestation of the digital assistant to perform a real world action upon the digital assistant of the another user;
    assigning, responsive to the identifying, one or more steps of the real world action to the digital assistant in a virtual space and to the digital assistant device of the another user in the virtual space determining a security risk level of the user command, that came from the user to the digital assistant device of the another user, identified based upon at least one allowance established on the digital assistant device of the another user and based on the user and the another user in the virtual space, wherein the security risk is associated with the user command; and
    transmitting based upon the security risk level, using the virtual reality device of the another user and responsive to receiving the user command from the user in the virtual space, an indication of the user command of the user to the digital assistant of the another user to perform the real world action, wherein performance of the real world action affects real world aspects unrelated to virtual content presented in the virtual reality environment.

2. The method of claim 1, wherein the command is a command selected from the group consisting of a voice command, a gesture command, a selection command, and a keyboard command.

3. The method of claim 1, wherein the digital assistant is not co-located with the virtual reality device.

4. The method of claim 1, wherein the establishing comprises establishing the connection using a cloud service.

5. The method of claim 1, wherein the performing comprises performing the action in the virtual reality environment.

6. The method of claim 1, wherein the receiving comprises receiving the user command from the another user having a shared presence in the virtual reality environment.

7. The method of claim 1, further comprising:
identifying another digital assistant associated with another user having a presence in the virtual reality environment;
wherein the performing comprises performing the action utilizing both of: the another digital assistant and the digital assistant.

8. The method of claim 1, further comprising manifesting an embodiment of the digital assistant in the virtual reality environment.

9. The method of claim 1, further comprising maintaining the connection with the digital assistant until a dismiss command is detected.

10. An information handling device, comprising:
a processor;
a memory device that stores instructions executable by the processor to:
detect, while in a virtual reality environment effectuated by the information handling device, an activation command from a user to activate a digital assistant embodied on a digital assistant device of another user;
establish a connection with the digital assistant device of the another user;
produce, subsequent to having established the connection, a manifestation of the digital assistant of the another user in the virtual reality environment of the digital assistant device of the user;
identify, subsequent to the producing, a user command from the user directed toward the manifestation of the digital assistant to perform a real world action upon the digital assistant of the another user;
assigning, responsive to the identifying, one or more steps of the real world action to the digital assistant in a virtual space and to the digital assistant device of the another user in the virtual space;
determining a security risk level of the user command, that came from the user to the digital assistant device of the another user, identified based upon at least one allowance established on the digital assistant device of the another user and based on the user and the another user in the virtual space, wherein the security risk is associated with the user command; and
transmit based upon the security risk level, using the information handling device of the another user and responsive to receiving the user command from the another user in the virtual space, an indication of the user command of the user to the digital assistant of the another user to perform the real world action, wherein performance of the real world action affects real world aspects unrelated to virtual content presented in the virtual reality environment.

11. The information handling device of claim 10, wherein the command is a command selected from the group consisting of a voice command, a gesture command, a selection command, and a keyboard command.

12. The information handling device of claim 10, wherein the digital assistant is not co-located with the virtual reality device.

13. The information handling device of claim 10, wherein the instructions executable by the processor to establish comprise instructions executable by the processor to establish the connection using a cloud service.

14. The information handling device of claim 10, wherein the instructions executable by the processor to perform comprise instructions executable by the processor to perform the action in the virtual reality environment.

15. The information handling device of claim 10, wherein the instructions executable by the processor to receive comprise instructions executable by the processor to receive the user command from the another user having a shared presence in the virtual reality environment.

16. The information handling device of claim 10, wherein the instructions are further executable by the processor to:
identify another digital assistant associated with another user having a presence in the virtual reality environment;
wherein the instructions executable by the processor to perform the action comprise instructions executable by the processor to perform the action utilizing both of: the another digital assistant and the digital assistant.

17. The information handling device of claim 10, wherein the instructions are further executable by the processor to manifest an embodiment of the digital assistant in the virtual reality environment.

18. A product, comprising: a storage device that stores code, the code being executable by a processor and comprising:
code that detects, while in a virtual reality environment, an activation command from a user to activate a digital assistant embodied on a digital assistant device of another user;
code that establishes a connection with the digital assistant device of the another user;
code that produces, subsequent to having established the connection, a manifestation of the digital assistant of the another user in the virtual reality environment of the digital assistant device of the user;
code that identifies, subsequent to the producing, a user command from the user directed toward the manifestation of the digital assistant to perform a real world action upon the digital assistant of the another user;
assigning, responsive to the identifying, one or more steps of the real world action to the digital assistant in a virtual space and to the digital assistant device of the another user in the virtual space determining a security risk level of the user command, that came from the user to the digital assistant device of the another user, identified based upon at least one allowance established on the digital assistant device of the another user and based on the user and the another user in the virtual space, wherein the security risk is associated with the user command; and
code that transmits based upon the security risk level, using the storage device of the another user and responsive to receiving the user command from the another user in the virtual space, an indication of the user command of the user to the digital assistant of the another user to perform the real world action, wherein performance of the real world action affects real world aspects unrelated to virtual content presented in the virtual reality environment.

* * * * *